No. 870,766.  PATENTED NOV. 12, 1907.
J. B. EATON.
APPARATUS FOR TREATING CATTLE.
APPLICATION FILED FEB. 8, 1907.

3 SHEETS—SHEET 1.

WITNESSES

INVENTOR
JAMES B. EATON
BY Paul & Paul
HIS ATTORNEYS

No. 870,766. PATENTED NOV. 12, 1907.
J. B. EATON.
APPARATUS FOR TREATING CATTLE.
APPLICATION FILED FEB. 8, 1907.

3 SHEETS—SHEET 2.

WITNESSES

INVENTOR
JAMES B. EATON
BY
HIS ATTORNEYS

No. 870,766. PATENTED NOV. 12, 1907.
J. B. EATON.
APPARATUS FOR TREATING CATTLE.
APPLICATION FILED FEB. 8, 1907.

WITNESSES
INVENTOR
JAMES B. EATON
BY Paul & Paul
HIS ATTORNEYS

UNITED STATES PATENT OFFICE.

JAMES B. EATON, OF FARGO, NORTH DAKOTA.

APPARATUS FOR TREATING CATTLE.

No. 870,766.   Specification of Letters Patent.   Patented Nov. 12, 1907.

Application filed February 8, 1907. Serial No. 356,370.

*To all whom it may concern:*

Be it known that I, JAMES B. EATON, of Fargo, Cass county, North Dakota, have invented certain new and useful Improvements in Apparatus for Treating Cattle, of which the following is a specification.

My invention relates to an apparatus for destroying lice and all kinds of parasites on cattle and other live stock, and the object of the invention is to provide means whereby an animal can be easily and quickly treated without danger of injury.

A further object is to provide an apparatus which will positively insure the destruction of all insect or germ life on the skin of live stock.

A further object is to provide an apparatus for conveying a germicidal fluid in such a manner as will completely saturate the hair to the skin instantly and maintain a flow of a germicidal fluid for sufficient time to kill all parasite and germ life on the animal and to treat all kinds of skin diseases.

A further object is to provide an apparatus for conveying a germicidal fluid in small jets or streams so arranged that hundreds of little jets or streams will strike all parts of the animal at the same instant, the force of the jet or stream washing the hair from the center of the stream or jet so that the liquid will penetrate instantly to the skin, the perforations in the pipes being arranged so that the jets or streams instead of traveling in a straight line will scatter sidewise as they leave the pipe and spread sufficiently to cover the animal.

The invention consists generally in various constructions and combinations, all as hereinafter described and particularly pointed out in the claims.

Figure 1:
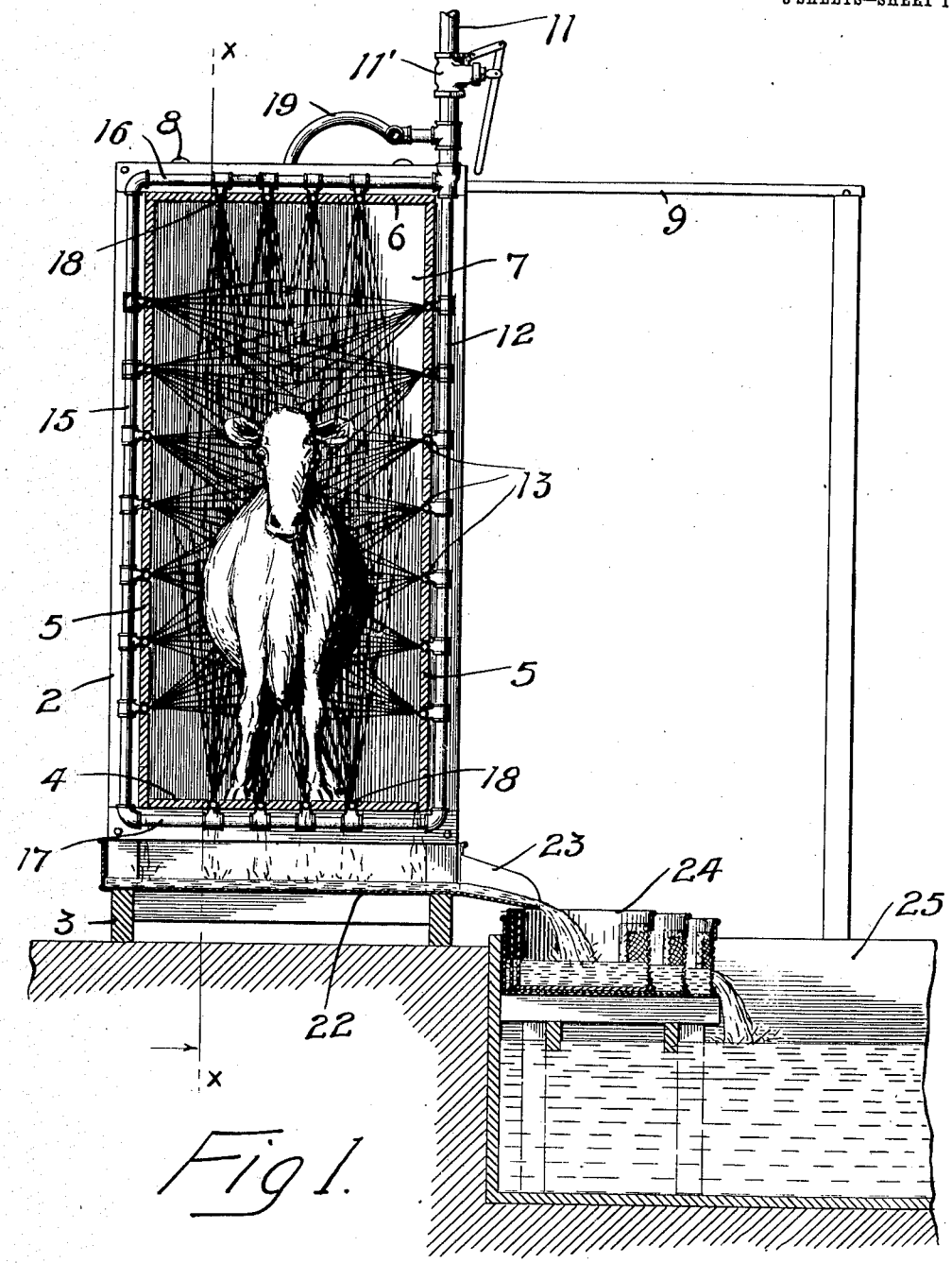
Figure 2:
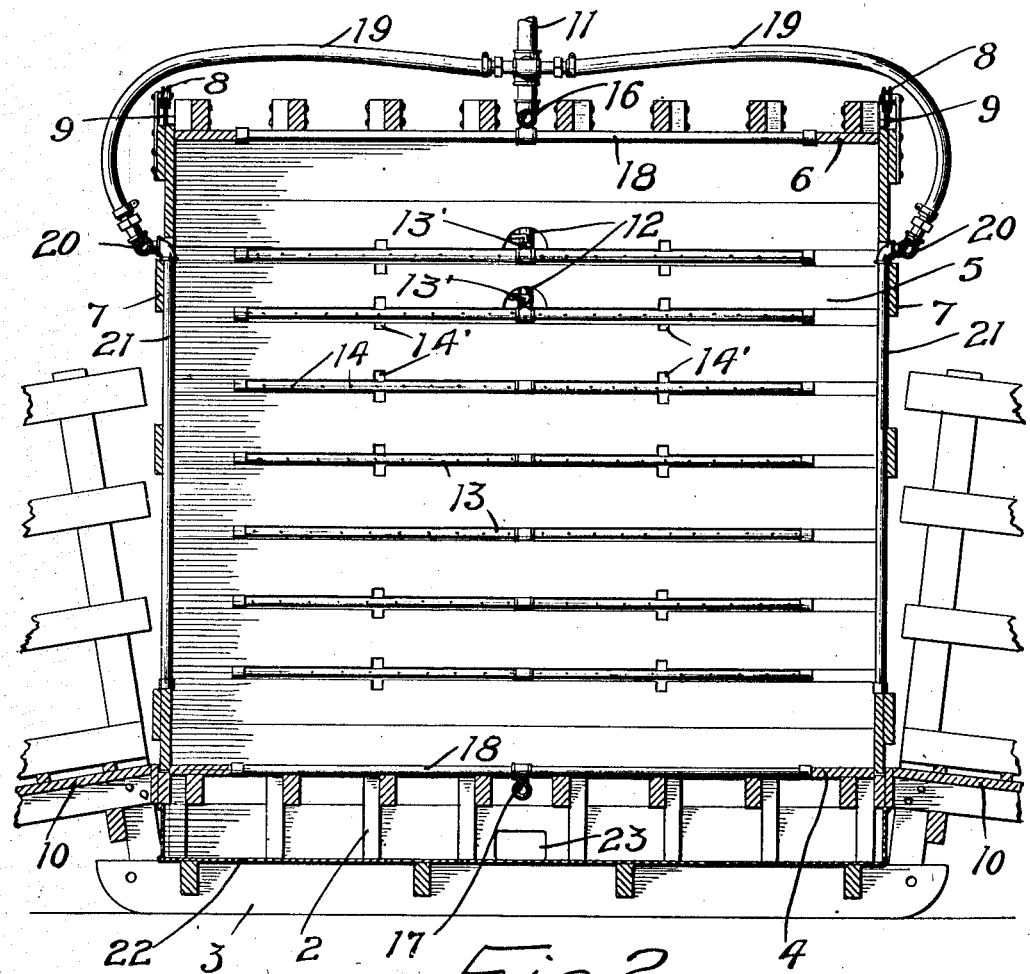
Figure 3:
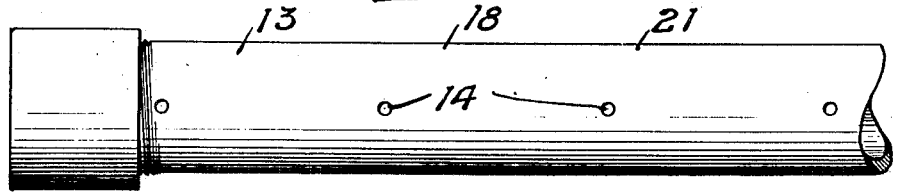
Figure 4:
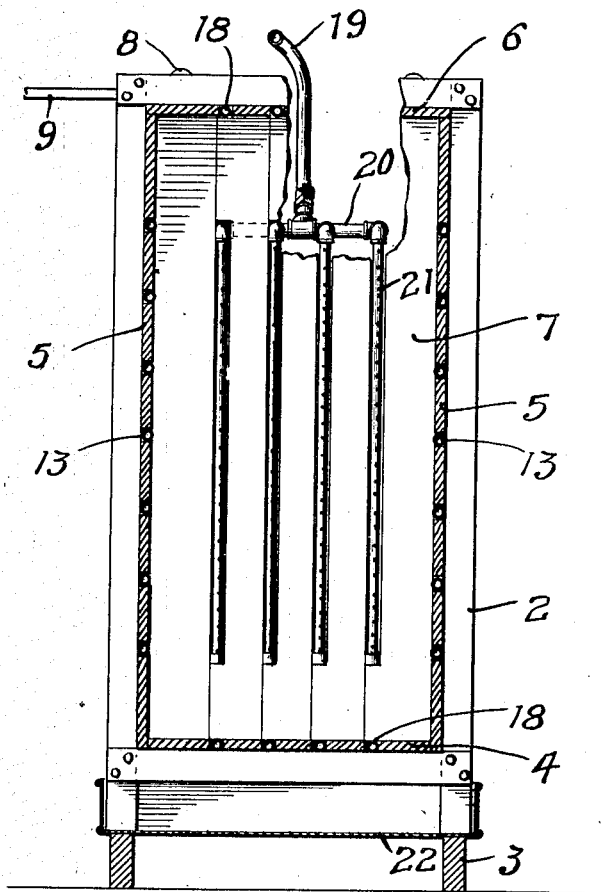
Figure 5:
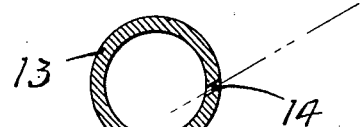
Figure 5:
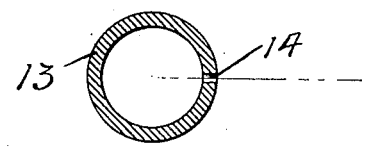
Figure 5:
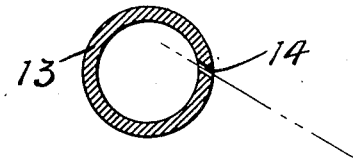
Figure 5:
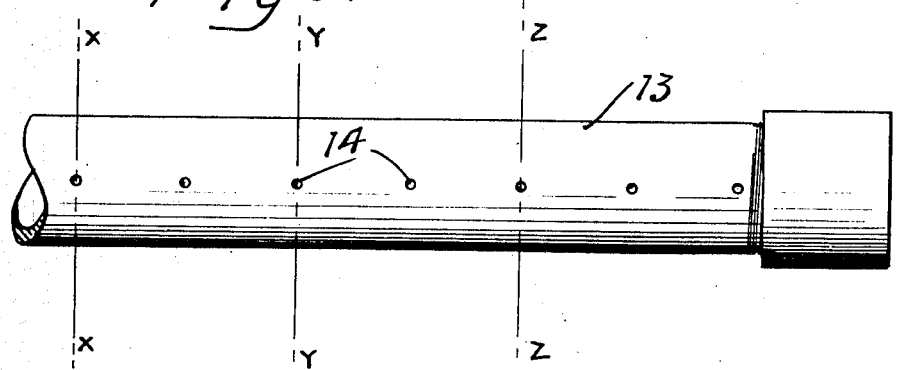

In the accompanying drawings, forming part of this specification, Figure 1 is a vertical transverse sectional view illustrating the crate or box into which the animal is driven and the manner of giving the bath and of collecting the liquid after it is discharged upon the animal. Fig. 2 is a sectional view on the line $x$—$x$ of Fig. 1. Fig. 3 is a detail view of a portion of one of the pipes provided in the crate or other receptacle. Fig. 4 is a vertical sectional view illustrating the perforated pipes at the end of the crate. Fig. 5 is a detail view of one of the pipes showing the perforations therein. Fig. 6 is a sectional view on the line $x$—$x$ of Fig. 5. Fig. 7 is a sectional view on the line $y$—$y$ of Fig. 5. Fig. 8 is a sectional view on the line $z$—$z$ of Fig. 5.

In the drawing, 2 represents a suitable crate supported upon shoes 3 for convenience in moving it from place to place and having a floor 4 whereon the animal stands, and side walls 5 and a top 6 of suitable sheathing.

The ends of the crate are closed by suitable gates 7 having wheels 8 adapted to run on tracks 9. These gates are moved back and forth transversely of the crate to open and close the ends. A gangway 10 is provided at each end of the crate on which the animal is driven until it is within the inclosure when the gate behind is closed and the front gate being closed also, escape is cut off during the operation of treating the hair and skin. As soon as the treatment is complete the forward gate is opened and the animal driven out. I have found in the care and management of live stock that the ordinary method of spraying an animal is insufficient to destroy the parasite and germ life, as a considerable portion of the solution is shed by the hair, and as a spray does not penetrate a sufficient distance to reach the skin and destroy the lice or other parasites which live on the skin of live stock. I have found, however, when the entire surface could be subjected to a strong flow of jets or streams of the solution that the hair and skin could be thoroughly saturated and the lice and other parasites or germs destroyed.

In carrying out my invention I provide a main supply pipe 11, being of sufficient size to feed the distributing pipes 12, 16 and 19, all being of sufficient size to carry the liquid without any perceptible loss of force from friction. The liquid passes from the pipes 11 and 12 down and into pipe 17 and from pipe 11 into pipe 16 and down through pipes 15 to 17, making a complete system entirely encircling the center of the crate on the outside. Just above the point where 11 connects with 19 and 12 is a quick acting valve 11' operated with a lever so adjusted that the liquid can be shut off instantly after an animal has been sufficiently treated and kept shut off until another animal is in the crate ready for treatment. The pipe 12 leads downwardly from the pipe 11 on one side of the crate and a series of pipes 13 are arranged transversely with respect to the pipe 12 and connected therewith, and are located one above another in the side walls of the crate and each pipe has a series of perforations 14 through which the liquid solution is projected. The perforations 14 are drilled in each pipe at different angles so that the streams therethrough will be projected up or down or to either side instead of straight ahead. This results in spreading the streams so that they will cover a larger area. The form of stream is illustrated plainly in Fig. 1 indicating the arrangement of the holes in the pipes. A similar number of pipes are provided on the opposite side of the crate communicating with the vertical trunk pipe 15, also with the horizontal transverse pipe 16 that extends across the top of the crate and connects with the pipes 12 and 11. A pipe 17 connects the lower ends of the pipes 12 and 15 and the pipes 16 and 17 are connected with rows of pipes 18 arranged transversely thereof and extending lengthwise of the crate and having perforations corresponding to those in the pipes 13. Branch pipes 19 lead from the supply pipe 11 and are connected to horizontal pipes 20 from which vertical pipes 21 lead and extend downwardly on the inside of the gates at the ends of the crate. The pipes 19 are flexible to permit the gates to be moved back and forth to open or close the crate. The perforated pipes are preferably arranged as shown in Fig. 1, in the walls of the crate or included by the thickness of the sheathing, while the supply pipes therefor are on the outside.

I have shown seven horizontal rows on each side of the crate, extending vertically a sufficient distance to insure the projection of streams of solution against the entire body of the animal from the back down to the legs, each perforated pipe at the sides having a shut off cock 13' so that when treating young or small animals the upper pipes may be closed. There are preferably four pipes on the top and in the bottom of the crate which project the streams at right angles substantially to the streams on the sides and insure every portion of the animal's skin being thoroughly saturated with the germicidal solution. In treating young or small cattle the upper side pipes may not be used and the flow of liquid to them may be shut off by means of small valves 13'.

Any germicidal mixture can be used that will form a thin liquid emulsion with water and kill such kinds of lice and other parasite or germ life as may be on the animal being treated. For example, the United States Bureau of Animal Industry recommends for this purpose the emulsion of lime and sulfur for killing scabbies on cattle. Other emulsions also, can be used, such as kerosene oil and soap emulsion, and many coal tar preparations that are on the market. A suitable pan 22 is provided beneath the crate to catch the liquid which passes through the spout 23 into a series of strainer vessels 24 which remove the hair and sediment and allows the liquid to flow into the vat or tank 25 from which it is delivered to an elevated tank (not shown), to be used again, or by a force pump (not shown), direct from said tank to the supply pipes.
Fresh emulsion is added from time to time to maintain the supply to take the place of the liquid carried away on the coat of the animals treated.

Cattle, horses and all kinds of live stock can be easily quickly and effectually freed from lice and all kinds of annoying germ life that live on their skin and hair, and all kinds of skin diseases can be treated at a small expense, as the same liquid may be used over and over again and without the slightest danger of injury to the animal treated. In the methods now generally practiced to kill lice and other parasitic or germ life, the animal is suddenly and completely submerged in a dipping or swimming tank and necessarily inhales some of the germicidal fluid into its lungs, resulting in occasional deaths from pneumonia, or the animal is injured and occasionally is drowned while being treated.

I claim as my invention:—

1. The combination, with a crate having open ends and gates therefor to permit an animal to be driven in at one end and out at the other, and a series of pipes provided in the bottom and top and each side wall of said crate, the top and bottom pipes extending transversely a distance equal to the breadth of the animal and the side wall pipes extending vertically a distance equal substantially to the height of the animal and all of said pipes extending substantially from end to end of said crate, and each pipe having a series of perforations through which a liquid solution may be projected in a small jet or stream against the animal in the crate, the perforations in each pipe being arranged in continuous rows and a supply pipe connecting said perforated pipes, substantially as described.

2. The combination, with a crate having open ends and gangways therefor and gates for closing said ends, of a series of perforated pipes provided in the top and bottom and side walls of said crate and through which a germicidal liquid solution may be projected against an animal within the crate, the perforations in each pipe being formed therein at different angles to the pipe, whereby the streams will be directed at different angles and a supply pipe connected with said perforated pipes.

3. The combination, with a crate having a stationary floor and open ends and gates therefor, a series of pipes provided one above another in the side walls of said crate and extending substantially from end to end thereof, a series of similar pipes provided in the top and bottom of the said crate, a supply pipe communicating with said side and top and bottom pipes, a series of pipes arranged vertically on said gates at the ends of the crate and having flexible connections with said supply pipe and all of said pipes having series of perforations through which comparatively small jets or streams of a germicidal liquid solution may be projected against the animal in the crate, substantially as described.

4. The combination with a crate, having open ends and gates for closing them, of perforated pipes provided in the side walls, top and bottom of said crate and on said end gates, the perforations in each pipe being bored to cause the streams to be projected therefrom at different angles, whereby a number of small jets or streams of the liquid contained in the pipes will strike all parts of the animal at the same time with a continuous flow, the streams being under sufficient pressure to wash the hair from the center of the stream where it strikes the animal, and permit the liquid to penetrate instantly to the skin.

5. The combination, with a crate having open ends and gates therefor, of perforated pipes provided in the walls, and the top and the bottom of said crate, the perforations in said pipes being formed in continuous rows and those in the same pipe being bored at different angles, whereby the streams will be correspondingly spread upon leaving the pipes, a supply pipe connected with said perforated pipes and communicating with a source of germicidal solution, and a pan arranged beneath said crate whereto the solution is directed, and a vat or tank having suitable straining vessels and a spout connecting with said pan, substantially as described.

6. The combination, with a crate having open ends and sliding gates therefor, of a series of perforated pipes mounted in the walls of said crate and on said gates, a supply pipe, flexible pipes connecting said gate pipes with said supply pipe and said supply pipe having a quick opening valve and through which a germicidal fluid is admitted to said perforated pipes, for the purpose specified.

7. The combination, with a crate having open ends, and gates therefor, to permit an animal to be driven in at one end and out at the other, and said crate having a stationary floor, of a series of pipes mounted in rows in the side walls, the top and the bottom of said crate, said pipes having perforations at intervals therein arranged to direct streams of a germicidal fluid at different angles upon the animal in the crate, and a supply pipe connected with said perforated pipes, substantially as described.

8. The combination, with a crate having open ends, and gates for closing said ends, of a series of pipes arranged one above another horizontally in the side walls of said crate, said pipes each having a series of perforations through which a germicidal fluid may be projected against the animal in the crate, a supply pipe connected with said perforated pipes and valves provided in the upper pipes of the series whereby the admission of the fluid thereto may be cut off in treating small or young animals.

9. The combination, with a crate having open ends and gates therefor, of a series of perforated pipes provided in the top and bottom and side walls of said crate, and on said end gates, the side wall pipes being arranged one above another and extending to a point above the level of the back of the animal in the crate, and the width of the rows of pipes in the top and bottom of the end gates of said crate corresponding substantially to the width of the animal in the crate, the perforations in said pipes being formed therein at different angles to one another, whereby the streams will be spread or deflected, and a supply pipe connected with said pipes.

In witness whereof, I have hereunto set my hand this 15" day of January 1907.

JAMES B. EATON.

Witnesses:
GEORGIA LING,
S. H. EATON.